(12) United States Patent
Feinstein

(10) Patent No.: US 10,444,908 B2
(45) Date of Patent: Oct. 15, 2019

(54) VIRTUAL TOUCHPADS FOR WEARABLE AND PORTABLE DEVICES

(71) Applicant: David Y. Feinstein, Bellaire, TX (US)

(72) Inventor: David Y. Feinstein, Bellaire, TX (US)

(73) Assignee: INNOVENTIONS, Inc., Houston, TX (US)

( * ) Notice: Subject to any disclaimer, the term of this patent is extended or adjusted under 35 U.S.C. 154(b) by 0 days.

(21) Appl. No.: 15/859,457

(22) Filed: Dec. 30, 2017

(65) Prior Publication Data

US 2018/0188894 A1 Jul. 5, 2018

Related U.S. Application Data

(60) Provisional application No. 62/441,277, filed on Dec. 31, 2016.

(51) Int. Cl.
*G06F 3/042* (2006.01)
*G04G 21/08* (2010.01)
*G06F 3/0488* (2013.01)

(52) U.S. Cl.
CPC .......... *G06F 3/0426* (2013.01); *G04G 21/08* (2013.01); *G06F 3/04883* (2013.01)

(58) Field of Classification Search
CPC .... G06F 19/321; G06F 19/3418; G06F 19/00; G06F 16/24; G06F 16/532;
(Continued)

(56) References Cited

U.S. PATENT DOCUMENTS 6,266,048 B1 7/2001 Carau, Sr.
6,798,401 B2 9/2004 DuFaux
(Continued)

OTHER PUBLICATIONS

A. Wilson and H. Benko, Combining Multiple Depth Cameras and Projectors for Interactions On, Above, and Between Surfaces, UIST '10 Proc. of the 23rd annual ACM symp. on User Intrerface software and technology, Oct. 3, 2010, pp. 273-282.

*Primary Examiner* — Kent W Chang
*Assistant Examiner* — Nathaniel P Brittingham

(57) ABSTRACT

Systems and methods for using portions of the surface around a wearable smart device as virtual touchpads for data and command entry are disclosed. For wearable smart devices worn on the wrist like smartwatches, the skin area over the back hand as well as the surface area over the arm adjacent to the device may serve as virtual touchpads. One or more side looking cameras facing each virtual touchpad may be used to detect touches and movements by one or more fingers on the virtual touchpads to simulate equivalent tactile gestures that control the device. Various surface artifact movements captured by the cameras may be used to confirm that the finger is actually touching the virtual touchpad and not just hovering above it. Sound sensors that independently detect and locate finger touches, as well as motion sensors that detect vibration corresponding to actual touch tap events, may be combined with the cameras to improve the detection accuracy of the tactile gestures. Touch position may also be detected by triangulation of encoded RF signals that propagate from one side of the device via the operator body to the back hand virtual touchpad. Two or more virtual touchpads can operate in interchangeable or complementary modes. During interchangeable operation mode, all virtual touchpads may respond to all the tactile gestures supported by the device. In complementary mode, some virtual touchpads may be restricted to recognize only a specific subset of the supported gestures.

24 Claims, 14 Drawing Sheets

(58) Field of Classification Search
CPC .............. G06F 16/9032; G06F 16/9038; G06F 16/951; G06F 17/5018; G06F 3/005; G06F 3/04815; G06F 3/04842; G06F 3/04845; G06F 3/04847; G06F 3/04883; G06F 3/04817; G06F 3/0482; G06F 2217/32; G06F 9/453; G06T 2207/30088; G06T 2200/24; G06K 9/6285; G09G 3/001

See application file for complete search history.

(56) References Cited

U.S. PATENT DOCUMENTS

| | | | |
|---|---|---|---|
| 7,664,476 | B2 | 2/2010 | Yanagida |
| 8,588,467 | B2 | 11/2013 | Yoon et al. |
| 8,624,836 | B1* | 1/2014 | Miller .................. G06F 1/163 345/157 |
| 8,896,526 | B1 | 11/2014 | Park |
| 10,067,610 | B2* | 9/2018 | Kim .................... G06F 3/0425 |
| 2013/0283213 | A1 | 10/2013 | Guendelman et al. |
| 2015/0323998 | A1* | 11/2015 | Kudekar ............... G06F 1/163 345/156 |
| 2016/0171127 | A1* | 6/2016 | Gannon .............. G06F 17/5018 700/98 |
| 2018/0188894 | A1* | 7/2018 | Feinstein ............... G06F 1/163 |
| 2018/0348853 | A1* | 12/2018 | Shchur ................... G06F 3/16 |

* cited by examiner

VIRTUAL TOUCHPADS FOR WEARABLE AND PORTABLE DEVICES

CROSS-REFERENCE TO RELATED APPLICATIONS

This application claims the benefit of provisional patent application Ser. No. 62/441,277, filed Dec. 31, 2016 by the present inventor, which is incorporated herein by reference.

STATEMENTS REGARDING FEDERALLY SPONSORED RESEARCH OR DEVELOPMENT

Not applicable.

REFERENCE TO A MICROFICHE APPENDIX

Not applicable.

TECHNICAL FIELD

The disclosed embodiments relate generally to a user interface between a man and a machine, and more particularly, to a virtual touchpads interface for a wearable and portable devices.

BACKGROUND

Many smart wearable devices have been introduced in the past decade. They provide extensive information by means of visual display or sound, employ smart sensors, use sophisticated processing and communication devices, and they are well integrated with the user's other smart devices.

The smartwatch has become the most popular smart wearable device in recent years. It allows the user to download, read and communicate information, conduct standard phone operations, and monitor their body's activities and health using sophisticated sensors. The integration of the smartwatch with other popular portable devices (in particular, the smart phone) brings forth many more sophisticated applications and uses.

While smartwatches have widely adopted the touch screen technology that made the mobile phone a great success, the inherently tiny screen found on a typical smartwatch is frequently too small for selective touch commands. The finger that touches the screen is always in the way, obstructing the display. Touch screen gestures often cause unintended activation of links that may be present on the screen during scrolling, and result in fingerprints and dirt being left on the display. It may also be difficult to see which input to make on the small screen, particularly for those with diminished eyesight.

The tiny screen found on a smartwatch is simply way too small to perform any common multi-touch commands like pinching, rotation, and other gestures. Placing two fingers on the screen will block most of the display area. Meanwhile, multi-touch gestures remain crucial for the user interface in many common applications. For example, the user may want to browse a map or a picture on the small screen of the smartwatch, or change the image scale. Typing data on the small screen is also close to impossible on wearable devices.

In the prior art, various devices with limited screen capabilities are routinely interfaced with external tactile input devices like the common mouse or touchpads. However, connecting such conventional tactile input devices is not possible for wearable devices since the device is worn on moving and often space limited surfaces. User interface solutions like virtual keyboard projection systems were deployed in recent years for smartphones, tablets and other mobile devices. However, this solution is not suitable for wearable devices because the body surface on which the virtual keyboard will be projected is neither flat nor even, and the skin has a texture and color that may not display projection images clearly. In addition, most wearable devices are low profile (i.e. they have low height), which makes proper projection of virtual keyboards close to impossible.

SUMMARY

The present invention discloses systems and methods to improve the user interface with wearable devices like a smartwatch. It assigns one or more virtual passive touchpads on the surface adjacent to the device, where the user can tap, drag, draw characters or perform multi-finger gesture commands which are captured by the device. Thus, generic tactile touchpad inputs to the device are simulated by the assigned virtual passive touchpad without the need of placing an actual tactile touchpad device on that area.

For a smartwatch, the back hand area near the wrist on which the smartwatch is worn, is an advantageous choice for a virtual touchpad. However, the back hand area is not perfectly flat. In fact, it is naturally curved along various directions and has small surface distortions (artifacts) due to the blood vessels, wrinkles and skin blemishes. Therefore, touch detection with infrared sensors that are common in virtual laser keyboards may not work effectively.

In some embodiments, the touch locations on the assigned virtual touchpad area are captured by one or more side looking cameras. The cameras detect one or more finger touch points relative to the captured image of the back hand surface. They can also detect complex gestures including hovering, touching (or tapping), and dragging. The cameras may detect small movements in the surface artifacts to confirm that the user's finger is actually touching the back of the hand, and not just hovering above it.

In some embodiments, the side looking cameras may be assisted with sound/finger tap sensors and movement sensors. The data from the sound/finger tap sensors is compared with the gesture analysis of the cameras to better pinpoint the position of the user's fingers over the virtual touchpad. Similarly, the data spikes from the movement sensor when the user actually touches the virtual touchpad may be used to correlate with the camera's data.

In some embodiments of a wearable device like a smartwatch, only one virtual touchpad is assigned on the back of the hand since this area is frequently exposed and available for a user tactile gesture interface. However, more than one virtual touchpads may be assigned. In the case of the smartwatch, a second virtual touchpad may be assigned over the user's arm near the smartwatch. When multiple virtual touchpads are assigned, they may work in an interchangeable operation mode or in a complementary operation mode. During interchangeable operation mode each virtual touchpad can detect the full set of recognized gestures. In the complementary operation mode, some of the multiple virtual touchpads may be restricted to recognize only a subset of the recognized gestures, and some gestures may have sub-gestures that need to be entered on specifically assigned virtual touchpads at a predefined order.

In accordance with some embodiments, the touch location over the back hand surface may be actively captured via an analysis of radio signal propagation delays along the user's body.

The teaching of side viewing cameras of the present invention is also applicable in other embodiments of a general purpose low profile device with a small screen that is placed on arbitrary surfaces. Selected areas of the surface surrounding the device may be used as assigned virtual touchpads.

These and other advantages, objects and features of the present invention will become apparent from the accompanying drawings and descriptions, and from the claims.

BRIEF DESCRIPTION OF THE DRAWINGS

For a better understanding of the aforementioned embodiments of the invention as well as additional embodiments thereof, reference should be made to the Detailed Description of the invention, in conjunction with the following drawings. It should be understood that these drawings depict only exemplary embodiments of the present disclosure and are not therefore to be considered to be limiting its scope. In the drawings, like reference numerals designate corresponding elements, and closely related figures have the same number but different alphabetic suffixes.

FIG. 8A captures the finger hovering above the touchpad, FIG. 8B captures the initial touch of the drag operation, and FIG. 8C captures the finger motion during the drag gesture.

DETAILED DESCRIPTION OF THE INVENTION

Figure 1:
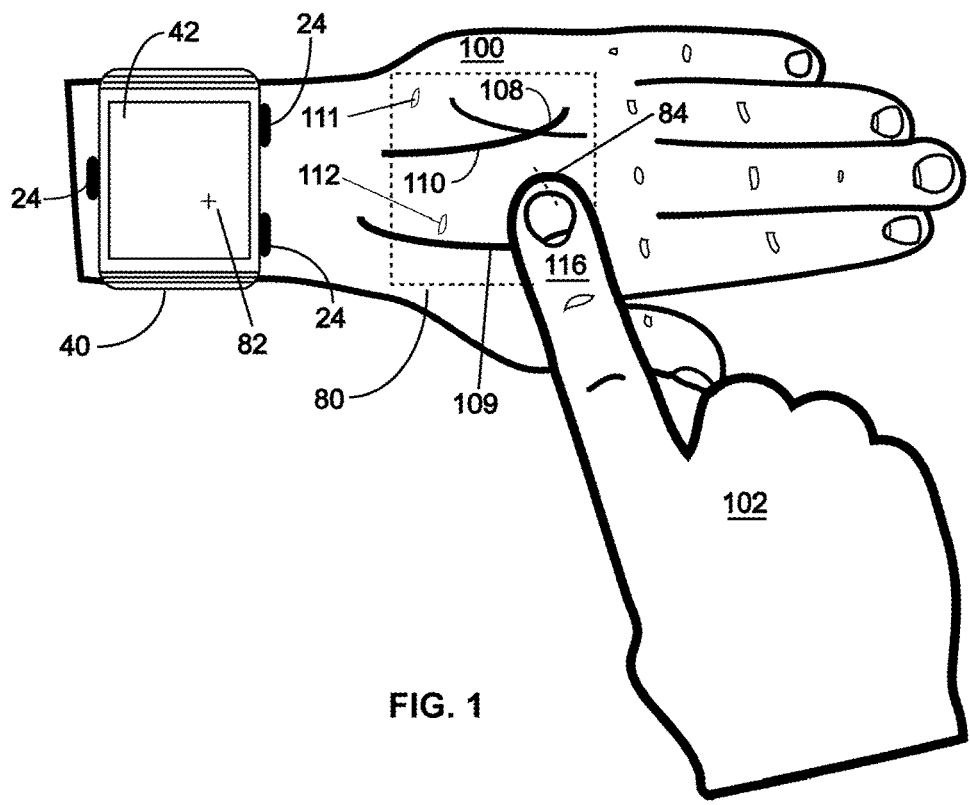
FIG. 1 illustrates a smartwatch demonstrating cursor control by a virtual back hand touchpad in accordance with some embodiments.

FIG. 1 illustrates a user wearing a smartwatch 40 on the user's left hand 100 having a display (also referred to as "screen view" or "screen display") 42 on which a cursor or a selection marker 82 is displayed. The smartwatch is used only as one example of common wearable device—persons skilled in the art should be able to readily adapt the teaching in this disclosure to other wearable devices, and following the discussion below in conjunction with FIGS. 16-18, to any other portable low-profile devices that are placed on arbitrary surfaces.

A portion of the back hand 100 surface 80 is assigned as a virtual touchpad on which touch gestures are detected. Unlike the well-known tactile touchpad that already has standard interface which is extensively used in the art to control connected devices, the virtual touchpad must be monitored externally to detect user's touch gestures. The detected gestures must simulate a corresponding tactile touchpad input that can be readily used by to the smartwatch. The virtual touchpad 80 is mapped on the back side of hand 100 in proximity to the smartwatch 40. The virtual touchpad allows the user to interface with the smartwatch 40 using one or more fingers of the right hand 102. The system detects the finger(s) 116 movement over the virtual touchpad, and simulates a corresponding standard generic touch touchpad or mouse activity as an input to the device. When simulating a standard tactile touchpad input, the virtual touchpad 80 may be directly mapped so that a touch at point 84 on the virtual touchpad 80 causes the cursor 82 to be in the corresponding position. The smartwatch may have one or more buttons 24 on both sides allowing the user to control some functions in the traditional way for older digital watches. For clarity purposes, buttons 24 will not be shown in the remainder of the figures of this disclosure.

It is well known that the hand surface is not a smooth flat surface. Further, the skin exhibits slight movements and shape changes (e.g. small depressions on the skin surface) whenever the user touches it and performs gestures with one or more fingers. It has visible blood vessels 108, 109, 110 and various stains, wrinkles and blemishes 111, 112. The various bones (not shown in the drawings for clarity) also cause various ridges and depressions on the back hand surface. Other individual elements visible on the back hand may include visible hair, birth marks and other textures. All these elements create a challenge for tracking the finger touch location with well-known techniques of the prior art that use laser detection of a touch over flat and light color surfaces in virtual keyboard projection applications. However, this uneven texture surface and the soft material movement during finger touches may be used to improve the detection accuracy of the tactile gestures in some embodiments of the present invention as further detailed below in conjunction with FIGS. 8A-8C and 9.

Figure 2:
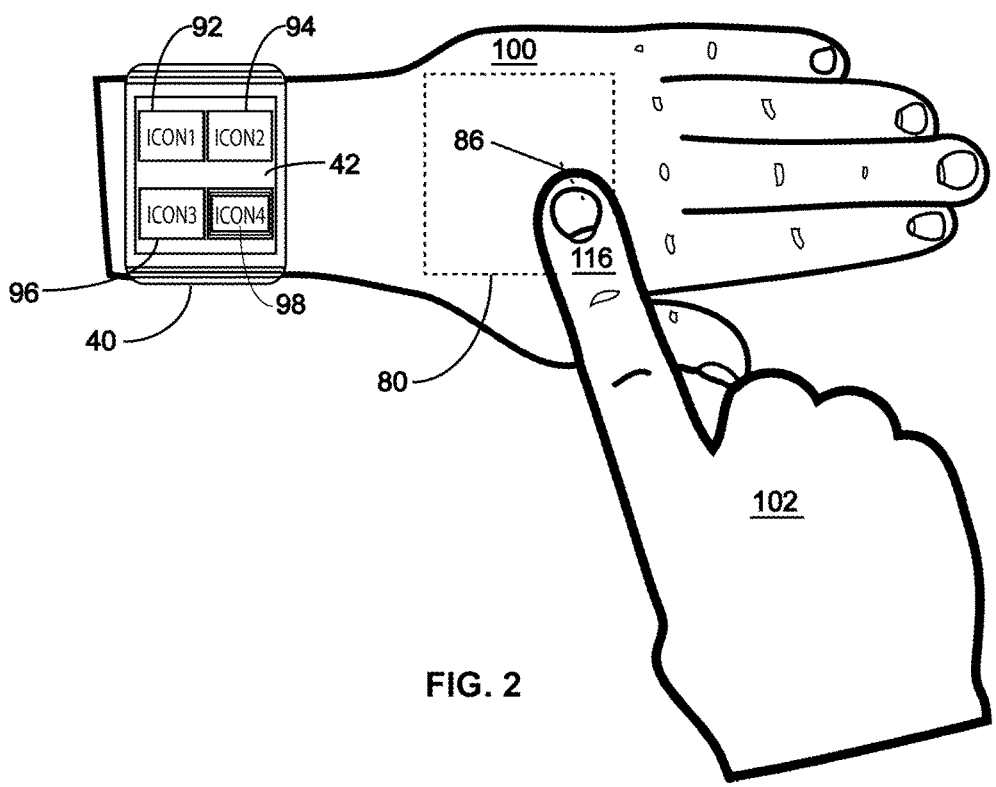
FIG. 2 shows how the virtual back hand touchpad may be used to select an action icon shown on the display.

FIG. 2 illustrates a simple tactile gesture by which a smartwatch 40 in some embodiments can be used for selecting an action marked by a group of icons 92, 94, 96 and 98. The user touches at point 86 which is at the right lower quadrant of the virtual touchpad 80 that is generally corresponding to ICON4 98 on the display. Thus, in this example, ICON4 is selected and if the user taps at point 86, the action associated with ICON4 is performed. This icon selection process is capable to work properly even with some significant inaccuracy in the determination of point 86.

Figure 3:
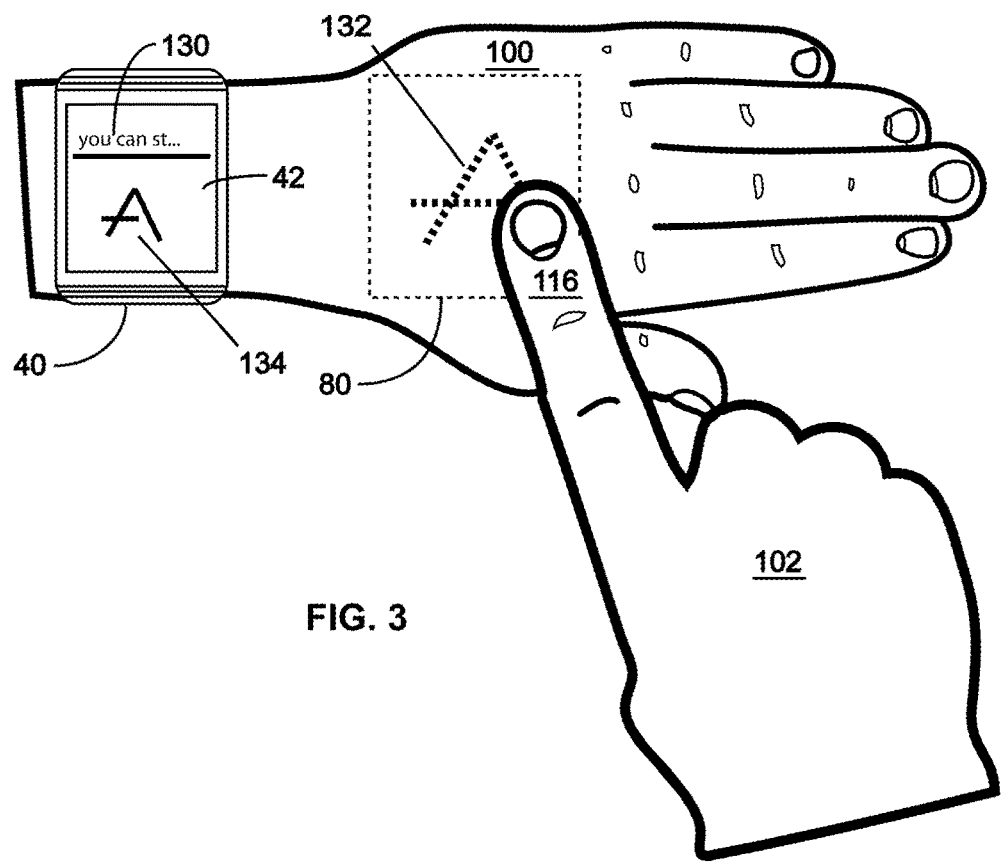
FIG. 3 shows how the virtual back hand touchpad may be used to enter character by drawing the shape of the character.

FIG. 3 demonstrates a text input mode wherein the user draws each character 132 on the virtual touchpad 80 with the index finger 116. As the process continues, the display 42 shows the characters recognized so far 130 as well as the currently drawn character 134. In the example of FIG. 3, the user is entering the sentence "[you can st]art now", where the bold characters within the brackets are already recognized by the system, and the current character entry is "a". Standard context prediction (e.g. auto-completion) techniques may speed up the entry process.

The text input operation of FIG. 3 requires complex tactile gestures, that include touch, drag, and hover operations performed by the operator's fingers. Such complex tactile gestures include multiple sub-gestures that must be performed in a predefined order.

Figure 4:
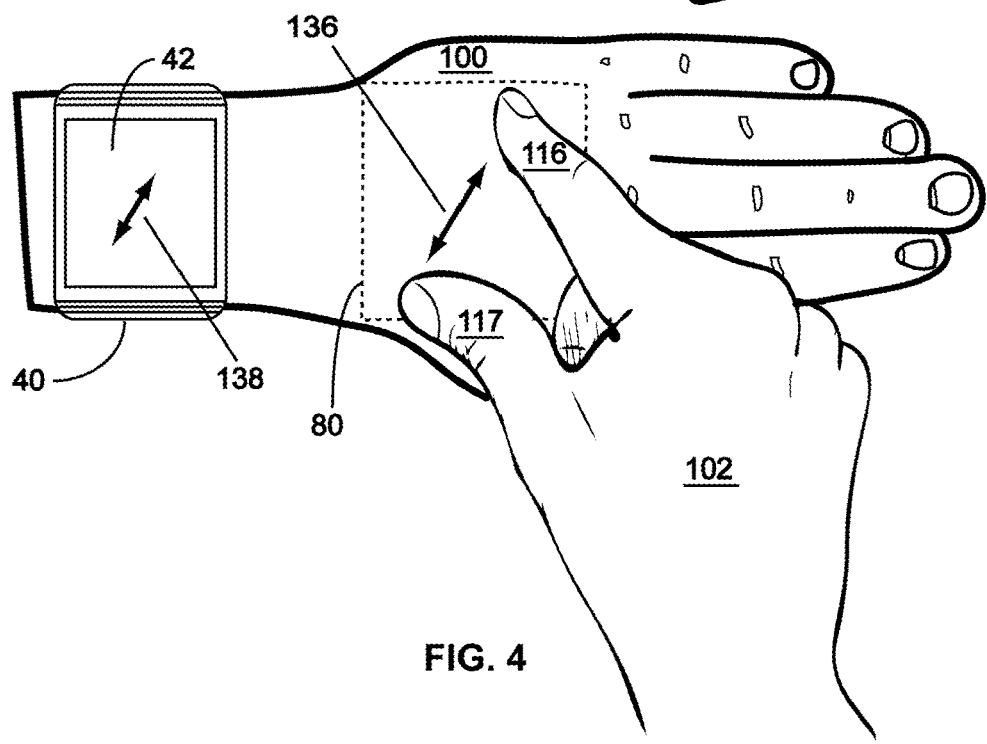
FIG. 4 illustrates the use of a common multi-touch gesture to increase display magnification.

FIG. 4 shows how a common multi-finger gesture like a pinch along the direction marked by the arrow 136 on the virtual touchpad 80 magnifies the display 42. The display 42 is proportionally magnified vertically and horizontally as shown by arrow 138. The virtual touchpad in this example simulates the standard multi-touch gesture to create an appropriate tactile control command for the smartwatch, using two fingers 116 and 117. The blood vessels 108, 109, and 110 and skin blemishes 111 and 112 that were drafted on FIG. 1 are not shown for clarity in FIGS. 2, 3 and 4.

FIGS. 1-4 demonstrated various tactile gestures that may be used to control the device 40. FIGS. 1, 2 and 4 showed very simple tactile gestures while FIG. 3 demonstrated quite a complex set of gestures that are required for text entry recognition. Examples of simple tactile gestures may include tap, double-tap, long-tap, drag and hovering by one or more fingers, as well as common multi-finger gestures like "pinch", "rotation" and the like. We refer in this disclosure to the set of all possible gestures that are recognizable by the device 40 as the set of predefined gestures. It should be understood that such a set can be extended either dynamically from one application to another, or by frequent product updates, for example, via the internet.

Figure 5:
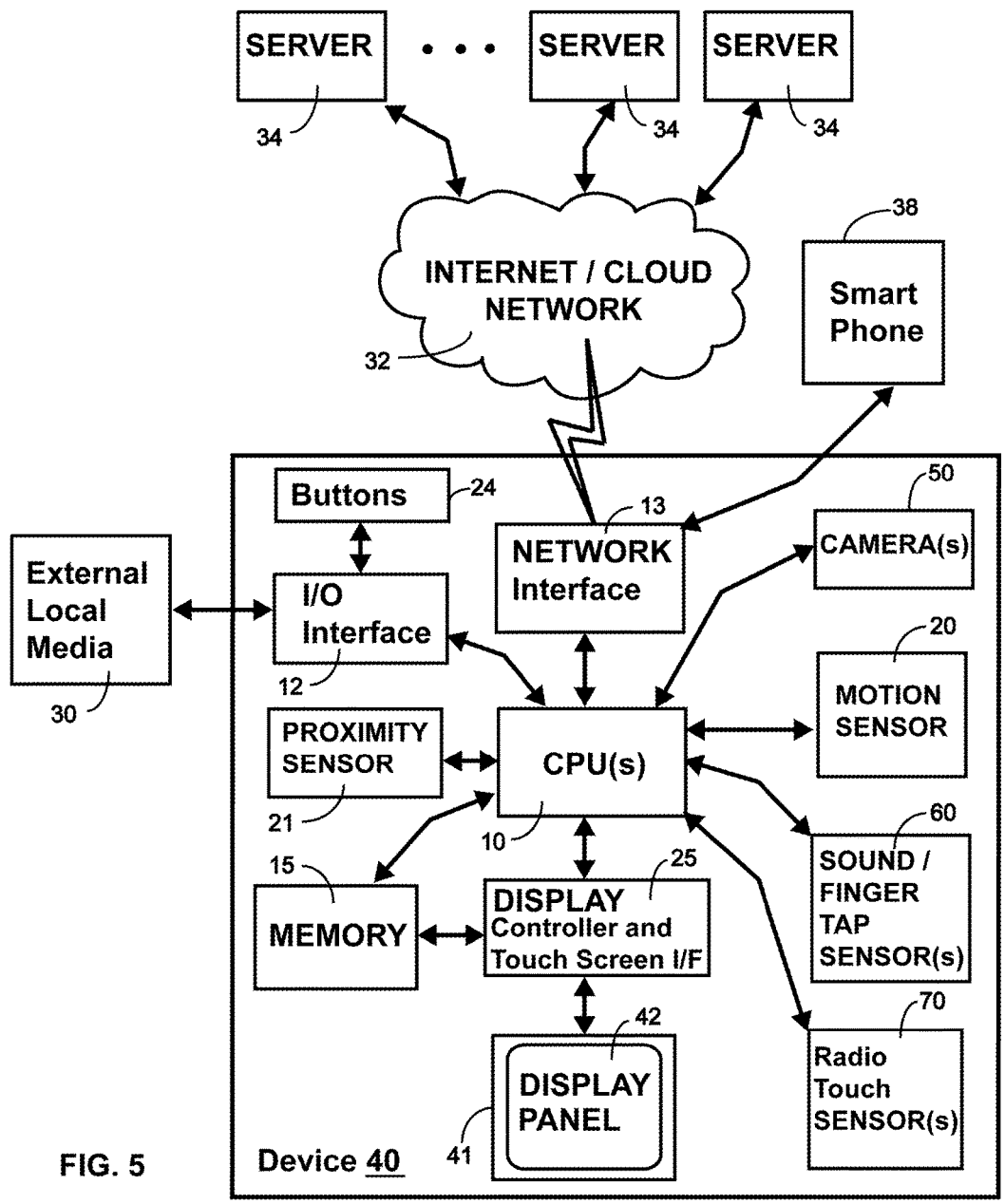
FIG. 5 is a block diagram illustrating a wearable electronic device that may be controlled by a virtual back hand touchpad.

FIG. 5 discloses an electronic device 40 like a smartwatch in accordance to some embodiments of the present invention. The processor 10 provides the processing and control means required by the system, and it comprises one or more Central Processing Units (CPU). The CPU(s) in small electronic devices are often referred to as the microprocessor or micro-controller. The processor 10 uses the memory subsystem 15 for retaining the executable program, the data and the display information. In general, the memory subsystem 15 is a tangible and/or non-transitory computer-readable storage media for storing computer-executable instructions or data structures. A motion sensor system 20 interfaces with the processor 10 to provide ballistic data relating to the movements and rotations (tilt changes) of the device made by the user. The ballistic data can be used by the microcontroller to correlate with detected finger touches on the virtual touchpad.

A display controller module 25 controls the display panel module 41 in accordance with a program executed by the processor 10 and further interfaces with the memory subsystem 15 for accessing the contents view. The display controller 25 may include local graphic memory resources. The display panel module 41 may be optionally equipped with touch screen interface to receive the user's touch gestures. In such embodiments the display controller 25 provides the processor 10 with the touch screen gestures performed by one or more fingers on the display panel. When the display stretches from one side of the device to the other, the touch sensing area may be extended beyond the boundaries of the display, so that the device can respond to user touches on the side of the device's case.

The motion sensor 20 detects rotational movements (or tilt gestures), movements and tap vibrations. There are many types of motion sensors, including gyroscopes, accelerometers, magnetic, mechanical, background radio direction sensors, and more. The motion sensor system may comprise an assembly of one or more sensors of different types, with a special "sensor fusion" algorithm designed to improve the accuracy. Often, the motion sensor 20 includes built in computing elements to perform the 'fusion' algorithm. For example, a 6-degree-of-freedom sensor, which comprises a combination of a 3-axis accelerometer and 3-axis gyroscope can be used to distinguish between rotational and movement data and provide more precise view navigation. It can also use accelerometer data to compensate for a gyroscope drift.

One or more cameras 50 may be employed to capture images of the virtual touchpads and their immediate surroundings. The CPU(s) perform standard image processing techniques on the captured images to extract the positions of the operator's fingers relative to the virtual touchpads. This allows the CPU(s) to determine where the user touches or to detect fingers hovering on the virtual touchpads during complex tactile gestures like those disclosed in FIG. 3. The cameras may use regular light or special waveform. As discussed below, the cameras may be placed on the side of the smartwatch viewing the back hand of the hand 100 wearing the smartwatch 40.

In some embodiments, the smartwatch 40 may include a sound/finger tap sensor(s) 60 that may detect finger tap commands by the user, as disclosed in my U.S. Pat. Nos. 6,466,198 and 6,933,923. When the user taps or touches the virtual back hand touchpad 80, the sound and vibrations of the finger tapping are conducted by the hand itself until it reaches the finger tap sensor(s) within the smartwatch enclosure. A plurality of such sensors may be used to pinpoint the location of the finger touch on the virtual touchpad 80.

The sound/finger tap sensor/s 60 may comprise a microphone and digital signal processing (DSP) interface to filter legitimate finger tap sounds and notify the processor 10. The DSP action may be performed by the processor 10, or may be performed by a built in microcontroller of a "smart" sound sensor. In other embodiments, the finger tap sensor may use a vibration detector like a piezoelectric finger tap sensor.

In some embodiments, the processor 10 performs a sensor "fusion" between the finger tap sensor(s) 60 and the motion sensor 20 to validate the finger tap commands. It correlates the sound (or vibrations) input from the finger tap sensor(s) 60 to the corresponding vibration captured by the motion sensor 20. This arrangement can distinguish between a finger tap sound made by the hand wearing or holding the device and another finger tap sound made by the other hand.

In some embodiments, the device 40 may include a radio system that acts as a radio touch sensor 70. The radio sensor sends an RF signal from a transmitting antenna via the user body to a set of receiving antennae that localizes the touch position on the virtual back hand touchpad 80 as described below.

The contents shown on the display may reside in the memory 15 or it can be acquired from remote servers 34 in the cloud or via the internet 32. The connection to the internet or cloud is performed via an optional network interface 13 module of device 40. Actual data flows can be via radio frequency or hardwired to a network plug. Alternatively, contents can be acquired from external local media devices 30 that are connected via an optional input/output interface module 12 of the device.

The user may interface her smartphone 38 via the network interface 13, using Bluetooth or other interface techniques. Smartwatches may include buttons 24 that are interfaced via the input/output interface module 12, to accept various user commands and input.

It should be apparent to a person skilled in the art that many variants of the block elements comprising the block diagram of FIG. 5 can be made, and that various components may be integrated together into one or more VLSI chips. The processor 10 can optionally access additional user interface resources such as a voice command interface. Various other components are typically used in the device 40 that are not shown explicitly in FIG. 5, but their existence should be recognized by a person skilled in the art. These components may include power/battery systems, RF communication circuitry, audio circuitry and other modules.

Figure 6:
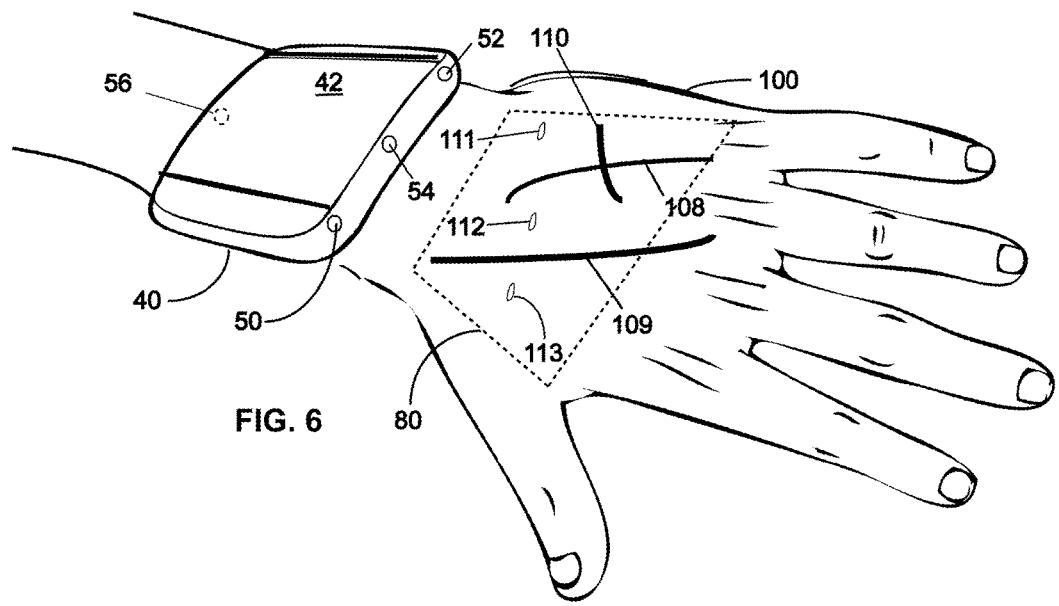
FIG. 6 illustrates cameras for detecting finger touch position on the virtual back hand touchpad in some embodiments.

FIG. 6 illustrates how two regular or infrared cameras 50 and 52 are placed on the side of the smartwatch 40 so that the cameras can detect finger gestures on the virtual touchpad 80 on the back hand 100. Alternatively, a single camera 54 may be placed on the middle of the side of the watch. In some other embodiments, cameras may be placed on the other side of the watch, e.g. 56, to allow the watch to be placed on either hand, or even to have additional virtual touchpad on the left side of the watch (when the user's arm is exposed, as illustrated below in FIG. 15).

As discussed in conjunction with FIG. 1, the top surface of the hand is not flat or smooth. It has visible blood vessels 108, 109 and 110, as well as various skin artifacts and blemishes 111, 112 and 113. The present invention makes use of these items to better determine the point of touch of the user finger, as described below in conjunction with FIGS. 8A-C and 9.

The user may need to calibrate the spatial resolutions of the camera by tapping with one finger on two opposite corners of the virtual touchpad 80 (or on all 4 corners), as described below in FIG. 11. Often the touches on the virtual touchpad 80 do not need to be very accurately resolved by the camera sensors as control can be quite good even with some significant inaccuracy in determining the exact touch location. Thus, some embodiments may use only one camera with a possible reduced accuracy in the determination of the finger touch location. Many control gestures can use the relative movement of the finger(s) touching the virtual touchpad instead of depending on the exact point of touch.

When using the two cameras 50 and 52 as shown in FIG. 6, the system receives two simultaneous images that are processed to determine the point of touch in each image. The data extracted from the two images are then combined to determine the finger touch locations. The two cameras 50 and 52 may be placed as far away from each other as possible, to provide the best stereoscopic analysis of the finger touch locations.

Figure 7A:
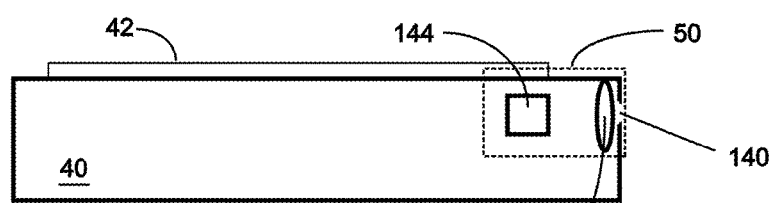
FIG. 7A depicts the position of one of the cameras of FIG. 6.

FIG. 7A illustrates the placement of the camera optical system 50 within the smartwatch 40 enclosure so that the camera monitors the back hand via the opening 140 on the side of the enclosure facing the back hand. An optical system 142 projects the view of the back hand onto the actual camera sensor 144, so that the area of the virtual touchpad is captured. The optical system may include wide angle or fisheye lens systems and mirrors to achieve this goal or it may be implemented with software processing that allows the capture and analysis of the area of interest. To achieve low implementation costs, the cameras may be generally selected with the lowest resolution that is still capable to locate the points of touch (e.g. 84, 86) of the user's finger(s).

Figure 7B:
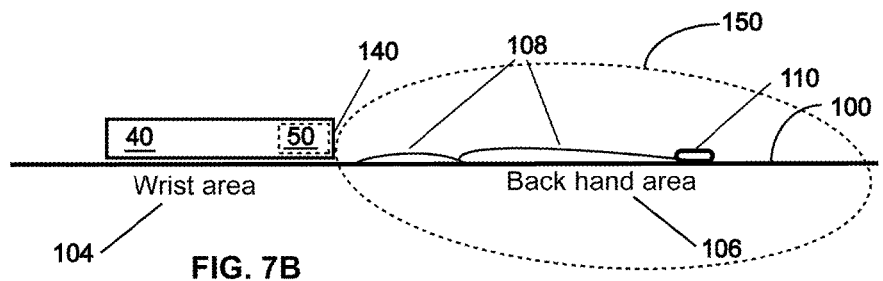
FIG. 7B illustrates a visibility cone of the camera of FIG. 7A in relation to the back hand area.

FIG. 7B shows the effective viewing cone 150 that is created by the optical system 142 in order to capture the finger touch locations. As the smartwatch 40 is worn on the wrist area 104, the viewing cone 150 is directed down towards the back hand area 106. Various features visible on the back hand like blood vessels 108 or other natural markers 110 may be used to better relate the finger touch point relative to the back hand area.

Figure 7C:
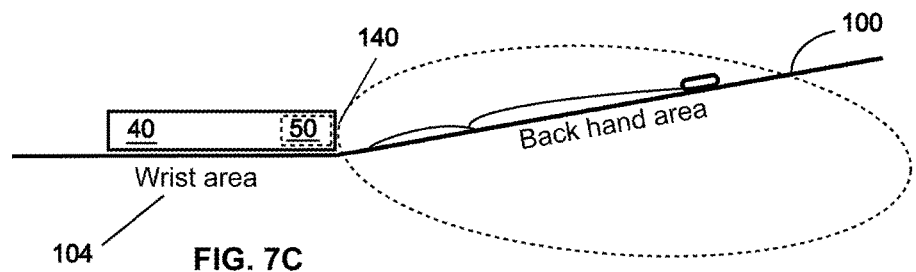
FIG. 7C shows how the back hand area may rotate relative to the camera when the hand is moved.

The user may naturally raise the back hand area relative to the camera 50 during operation. The system needs to constantly correct for such changes in the angle at which the camera looks at the back hand area. FIG. 7C shows how the back hand area may be tilted upwards to provide a better view of the back hand surface area for the cameras.

Figure 8A:
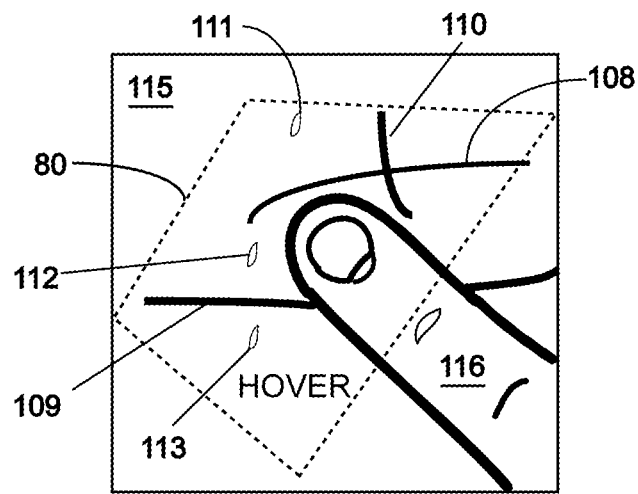
FIGS. 8A-8C demonstrates changes in the captured images of the back hand touchpad surface during a touch drag gesture.
Figure 8B:
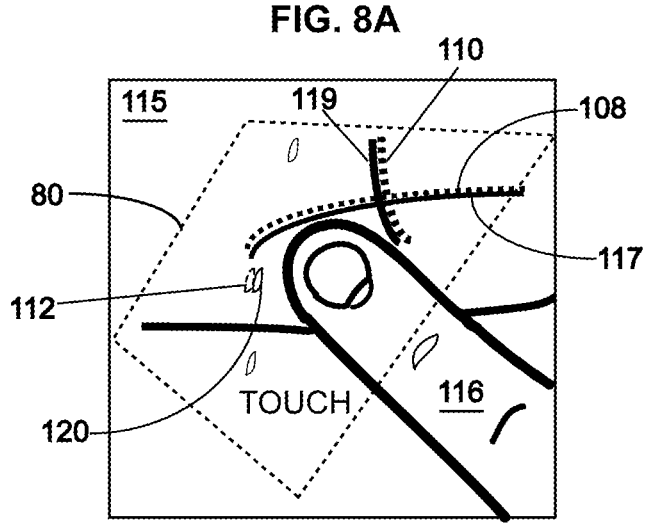
Figure 8C:
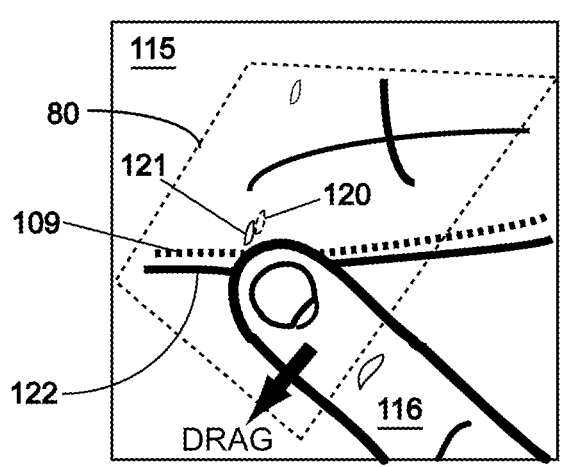

In some embodiments with cameras, the slight movements of the skin surface over the virtual touchpad area occurring when the user touches the back hand surface may be used to improve the touch detection process as illustrated in FIGS. 8A-8C. Each of these figures illustrate the captured image 115 that shows details of the assigned virtual touchpad surface area 80, the finger 116, and the various blood vessels 108, 109 and 110 and blemishes 111, 112, 113. Throughout this disclosure, we refer to the blood vessels, the blemishes and other texture variances as surface artifacts. While the captured image 115 is shown as having a rectangle shape, it should be understood by any person familiar with the art of image processing that the shape can be different, e.g. ellipsoid, based on the specific implementation of the optical system 50.

FIG. 8A illustrates the captured image 115 when the finger 116 is hovering over the intended touch point. Notice that the surface artifacts 108, 109, 110, 111, 112, and 113 appear to be undisturbed, because the finger is not yet depressing the skin. Therefore, the system regards the situation depicted in FIG. 8A as "Hover". FIG. 8B illustrates what happened when the finger 116 actually touches the skin of the back hand. Blood vessels 110 and 108 slightly move to positions 117 and 119 in response to the touch. Similarly, blemish 112 slightly moves to position 120. The processing of the captured image 115 detects these minute changes and updates the situation from "Hover" to "Touch".

Assuming that the user is performing a drag gesture, FIG. 8C demonstrates visible changes in the surface artifacts of the back hand and the position of the finger 116. Now that the finger is dragged in the direction of the arrow, blood vessels 108 and 110 are restored to their undisturbed positions, as the finger 116 is no longer affecting them. Currently, during this drag operation, the captured image 115 of FIG. 8C shows minute movements of the blood vessel 109 to 122, and blemish texture 120 to 121. The processing of the captured image 115 continuously detects these minute changes on the surface artifacts, thus confirming that the finger 116 is actively touching (and therefore, depressing) the back hand surface. The overall movement of the finger is recorded and analyzed as a drag gesture. Thus, a simulated tactile drag command is provided to the smartwatch.

Figure 9:
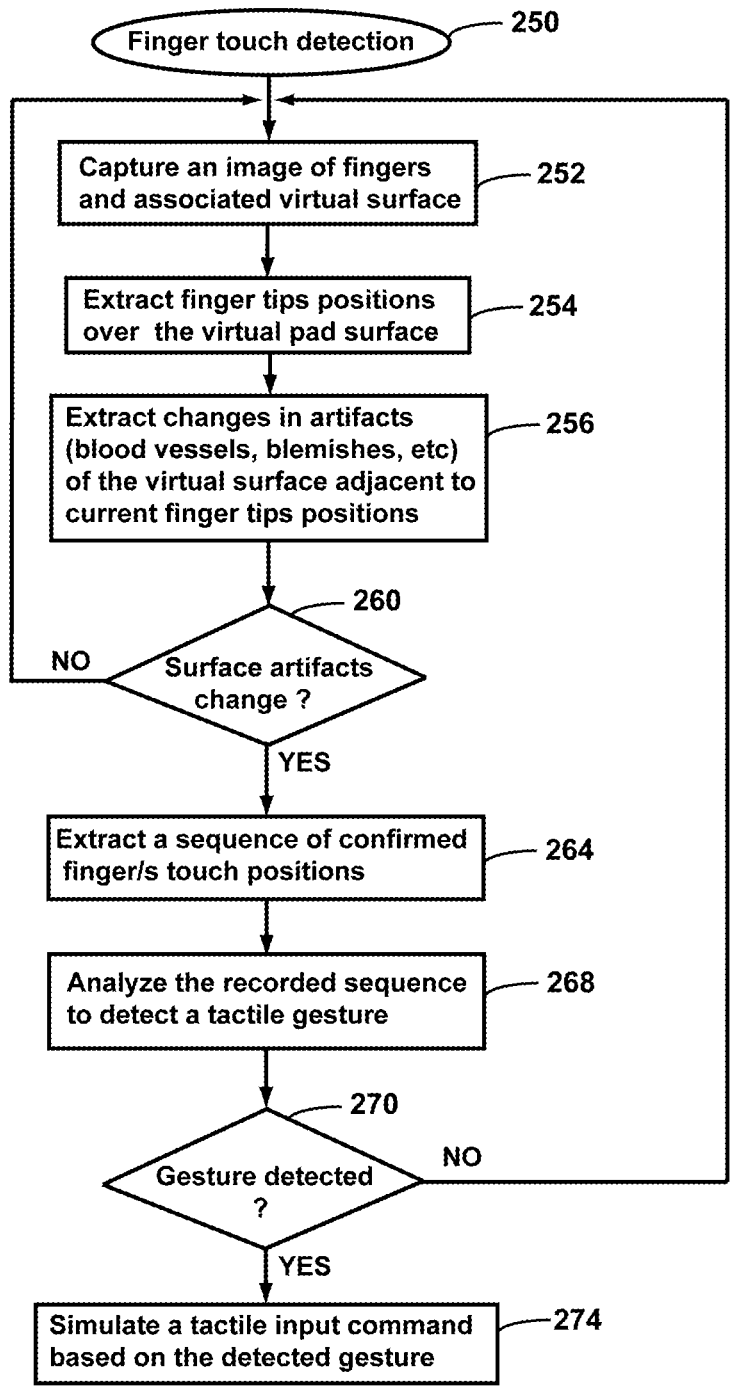
FIG. 9 is the flow diagram of the analysis of the captured images of FIGS. 8A-8C.

The process of finger touch detection 250 of FIGS. 8A-8C is performed in some embodiments along the flow diagram shown in FIG. 9. At step 252, an image of the fingers and the associated virtual surface is captured. This image is processed in step 254 to extract the position of one or more finger tips over the virtual touchpad's surface. At the same time, step 256 extracts any positional and shape changes in the surface artifacts (blood vessels, blemishes, wrinkles and textures) adjacent to the current finger tips positions. Decision step 260 determines if the surface artifacts change in correlation to the movement of the finger over the virtual touchpad. If changes in the surface artifacts are detected and determined to be related to actual finger touch as explain in conjunction with FIG. 8A-8C, step 264 extracts a sequence of the finger positions to detect a valid tactile gesture.

Step 268 of FIG. 9 continuously analyzes the sequence of the finger touch positions. When decision step 270 confirms that a viable touch gesture was performed by the user, the gesture detection is concluded. Step 274 then simulates a tactile input command based on the detected gesture. This input command is provided to the smartwatch and the device screen or its functions are changed accordingly. The process of steps 252, 254, 256, 260, 264, 268, and 270 may be run continuously in a loop, depending on the operation mode of the smartwatch device.

Figure 10A:
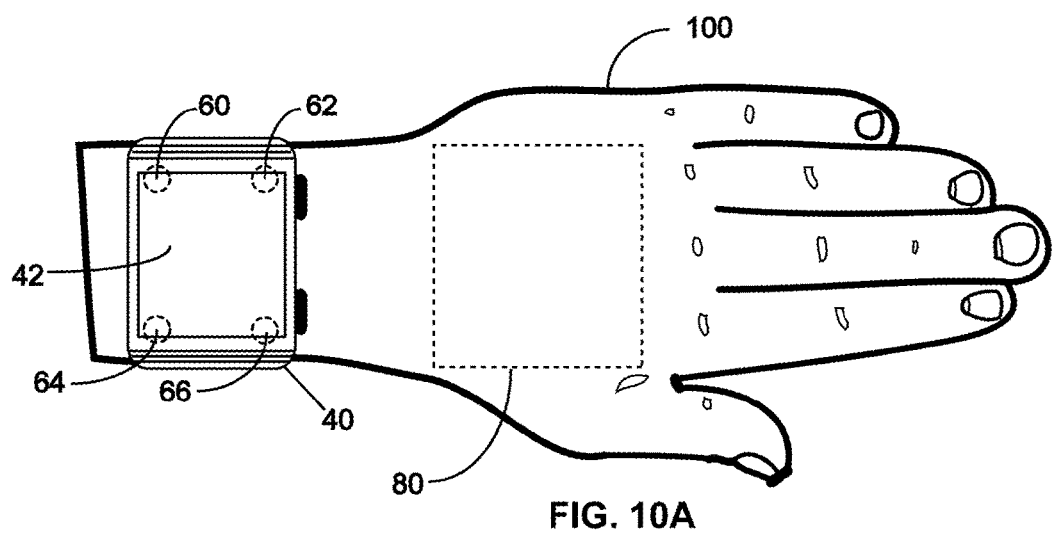
FIG. 10A shows a use of an array of sound sensors placed at the bottom of the smartwatch that may detect finger tap positions on the virtual back hand touchpad.
Figure 10B:
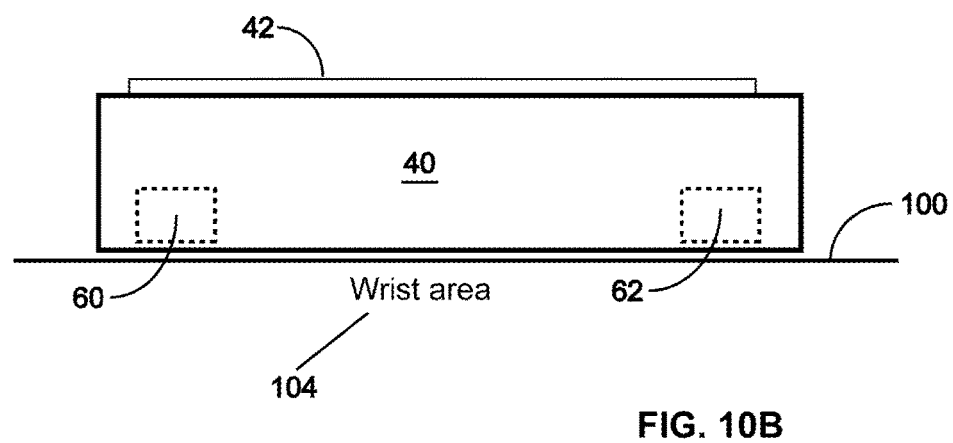
FIG. 10B illustrates the position of the sound sensors of FIG. 10A.

In some embodiments, the smartwatch may employ a plurality of sound sensors as shown in FIG. 10A. Here there are four sound sensors 60, 62, 64 and 66 which are placed close to the corners of the smartwatch near the bottom of the enclosure, as illustrated in FIG. 10B. Thus, the sensors are close to the wrist area 104. The four sound sensors may employ an array-based detection technique to determine the location of the touch on the virtual touchpad 80. The sound detectors may be combined with a motion sensor to verify and better analyze the tap location as discussed with FIG. 12 below.

Figure 11:
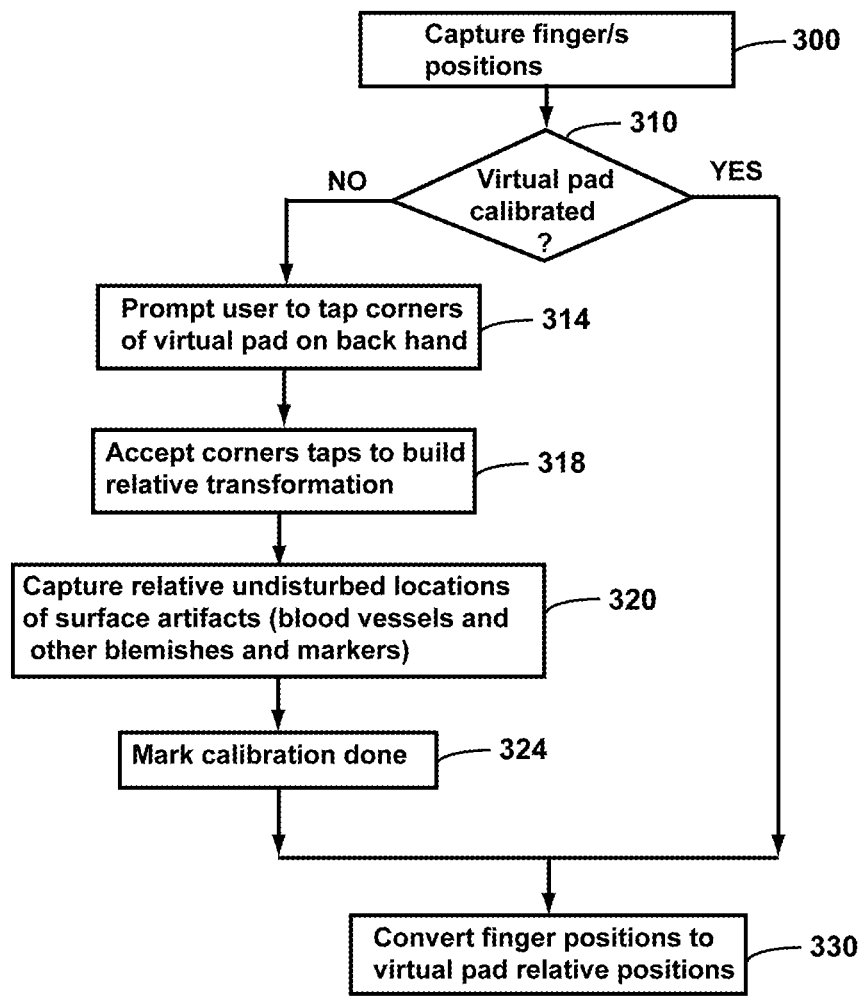
FIG. 11 shows a process flow diagram that performs an initial calibration of the virtual touchpad.

FIG. 11 shows a flow diagram of the calibration of the virtual touchpad 80 placement on the back hand. Step 300 captures the finger position using cameras or sound sensors or a combination thereof. Decision step 310 checks if a calibration of the virtual touchpad 80 has already been made. If not, the system prompts the user in step 314 to tap corners of the virtual touchpad on the back of the hand. The user may tap two opposite corners or all four corners of the desired virtual touchpad area. The system accepts the input in step 318, and creates a relative transformation to the display by correlating the corners of the display to the corner points entered by the user. Step 320 may optionally capture, if cameras are used, the relative positions of the various surface artifacts (blood vessels 108, 109, and 110 and other natural blemishes 111, 112, and 113) viewable on the back hand virtual touchpad. These artifacts may be used to assist in the touch point detection as illustrated above. The system also marks a calibration done flag in step 324 so that the calibration process is not repeated. Step 330 converts the detected finger positions on the virtual touchpad into relative position information that maps the finger position on the virtual touchpad onto the corresponding relative position on the device's display. In some embodiments with more than one virtual touchpads, some of the virtual touchpad may be calibrated to a non-related area shape that is not directly mapped to the actual shape of the device display. This occurs when the particular virtual touchpad is used for number of taps detection only, e.g. in the complementary mode discussed in conjunction with FIG. 16 below.

Figure 12:
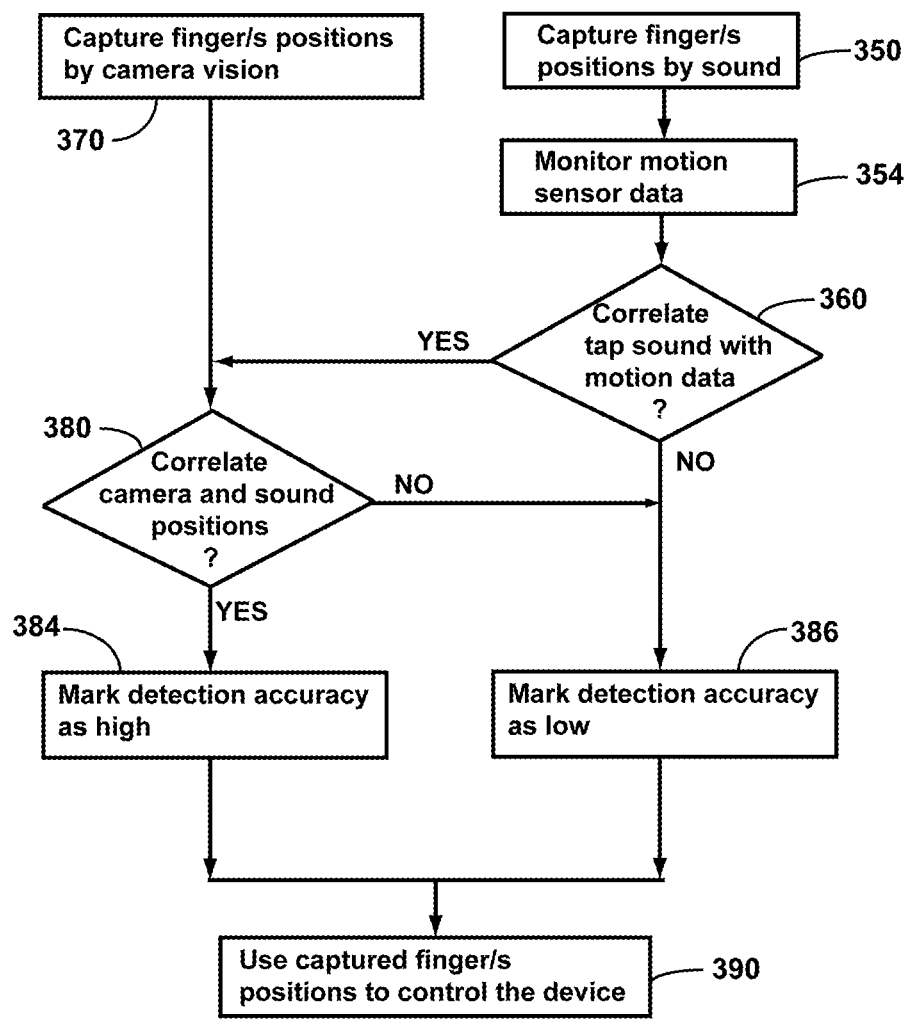
FIG. 12 shows a process flow diagram that combines data from sound sensors, motion sensors and camera data to obtain more accurate determination of finger positions on the virtual touchpad.

While the previous discussion indicated how to detect the finger touch locations using different methods, it is possible that the smartwatch device will include several sensors for various functions. For example, as shown in my pending U.S. application Ser. No. 15/394,643, a smartwatch may use wrist tilting for view scrolling with finger tapping to input commands. Such a smartwatch will include a motion sensor 20 and a sound/finger tap sensor 60 to perform this operation. The smartwatch may also employ the cameras 50 for the present invention. The availability of multiple sensors allows increase accuracy of detecting finger touch location. FIG. 12 illustrates how data from various sensors that may be employed in some embodiments can be correlated to improve the accuracy of determining the finger touch positions.

Multiple sensors may be grouped together to obtain an overall better accuracy than when using only one type of sensor. In some embodiments, the smartwatch embodiment relating to FIG. 10 includes cameras 50, sound sensors 60 and motion sensor 20. Step 350 captures finger positions using sound sensor as described in FIG. 8A. Step 354 monitors the motion sensor data and correlates the data with the sound data. Decision step 360 looks at the correlation and if there is no good correlation, it may use the data from the sound sensors but mark the detection accuracy as low in step 386. Alternatively, it may discard the data if the correlation between the motion data and the sound data is very bad. Step 370 capture finger(s) position using the cameras, independently to step 350. If step 360 indicated that there is a good correlation between the sound data and the motion data, the finger touch positions computed by step 370 from the cameras are compared with the positions computed by the sound and motion vibration data. If the data correlates well, decision step 380 marks the detection accuracy as high in step 384. The data is then used in step 390 to control the smartwatch device. If there is no good correlation, decision step 380 marks the accuracy as low in step 386.

Differences between the sound data and the camera data may be used to improve each other if common predictive estimation techniques are used. FIG. 12 (without steps 370 and 380) illustrates how sound sensors and motions sensors can be used together to improve the accuracy of the detection of the touch location when there are no cameras 50 in the device. Similarly, in some embodiments, the cameras may be combined only with a motion sensor 20 to detect vibration during a tap on the virtual back hand touchpad.

The arrangement in FIG. 12 may obtain occasional positioning fixes during periods of time that the detection accuracy is marked high in step 384. In the other time periods, the camera vision detects the finger position at a lower accuracy but assesses the correct relative position to previously accurately captured positions. Various control estimation and correction techniques known in the art may be employed to further improve the accuracy of previously recorded sequence of finger positions based on these intermittent more accurate positioning data. For example, position sequence data may be recorded as "estimation" when the detection accuracy is marked as low by step 386. During intermittent times when higher accuracy is indicated by step 384, the entire "estimation" sequence that has been recorded so far is adjusted based on the higher accuracy positions.

Figure 13:
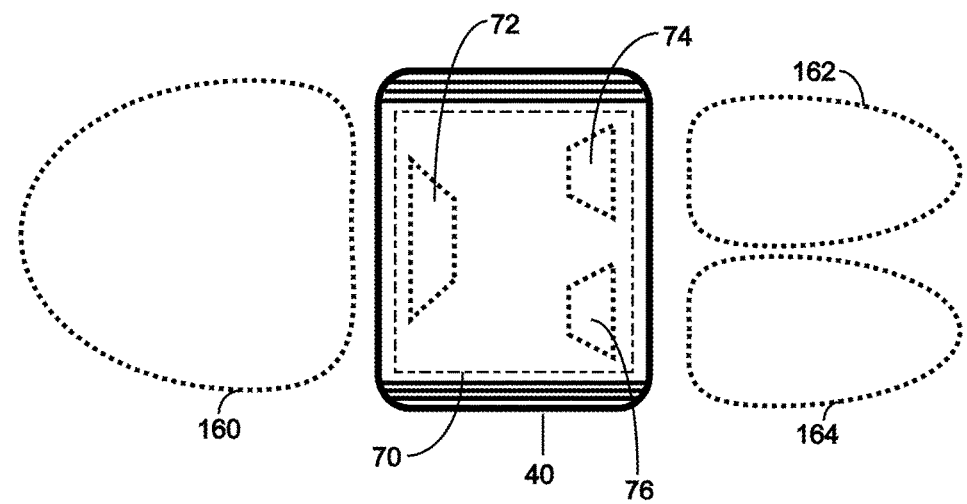
FIG. 13 illustrates a radio sensor for the detection of finger tap positions on the virtual back hand touchpad.

The cameras 50 and the sound/tap sensors 60 described above are passive sensors, where the system determines the touch location(s) on the virtual back hand touchpad 80 from what it "sees" or "hears". In some embodiments, the device 40 may include a radio system that act as a radio touch sensor 70, as shown in FIG. 13. The radio sensor sends an RF signal from one or more transmitting antenna 72 via the user body to a set of receiving antennae 74 and 76 that localizes the touch position on the virtual back hand touchpad 80. FIG. 13 illustrates the optimized gain map 160 of the transmitter showing that the transmitter is generally directed towards the body of the user. Similarly, the optimized gain maps 162 and 164 for the receivers 74 and 76, respectively, are directed towards the back hand area with the virtual touchpad.

Figure 14:
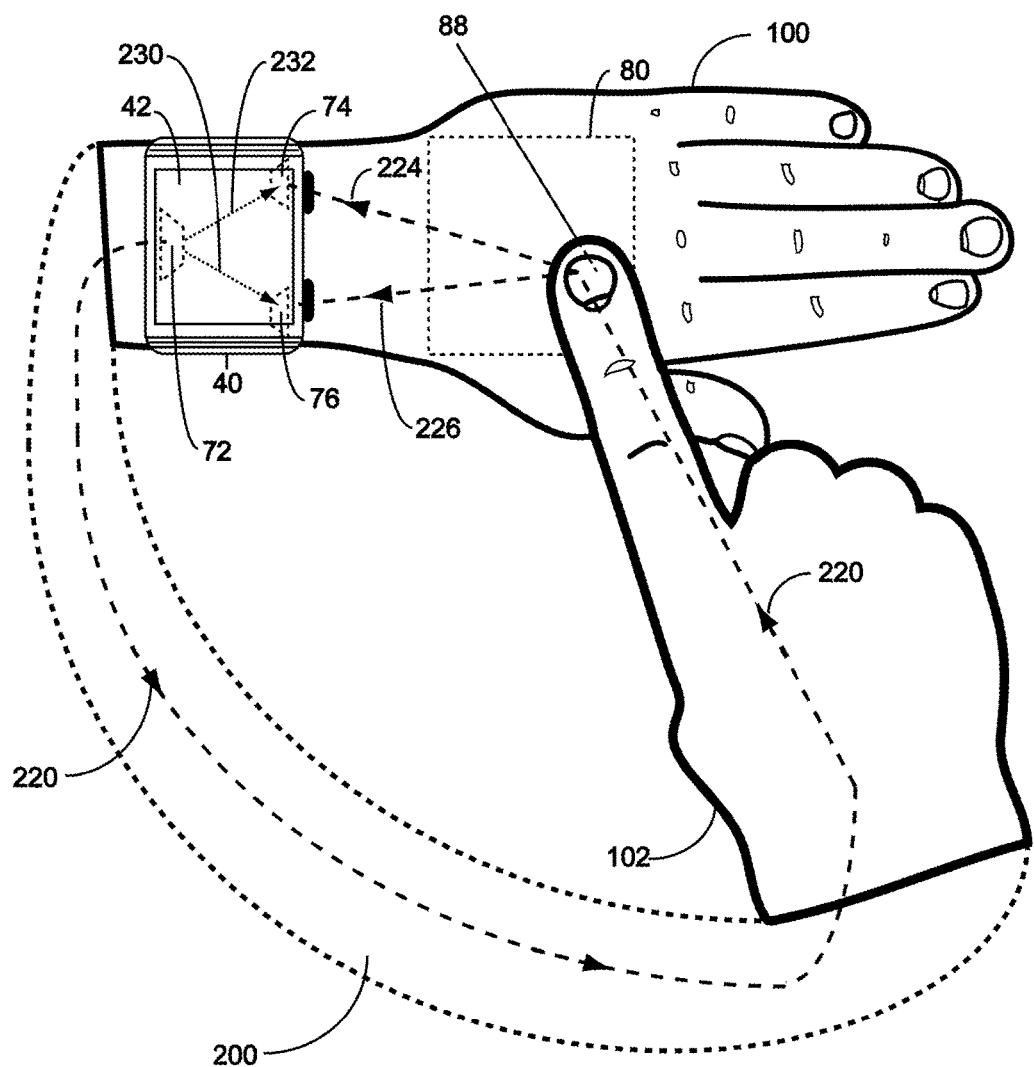
FIG. 14 details the propagation paths of signals of the radio sensor that are used to determine the finger touch position.

FIG. 14 illustrates how signals are being transmitted and received between the transmitter 72 and the receivers 74 and 76. The user's body performs as a communication channel 200 connecting the two hands. The transmission signal along path 220 reaches the right hand 102 and the touch point 88 over the virtual touchpad 80. From the touch point 88, the transmission reaches the receiver via paths 224 and 226. Even though the antennae gain map directs the transmission and receiving as shown, some intensity of the transmitted signal from the transmitter 72 reaches the receivers 74 and 76 directly along the short paths 230 and 232. The radio sensor compares the arrival time from path 224 and 226 that are changing in triangulation of the touch point 88, with the arrival time of fixed delay via paths 230 and 232 to determine the touch point 88 location over the virtual touchpad 80.

The transmission signal from transmitter 72 should be extremely low to conserve battery. It is designed to use frequencies that well propagate over the skin of the user's body 200 from the device 40 to the virtual touchpad 80. To avoid the need of constant transmission, the radio sensor 70 may be kept normally inactive, until a user command activates the virtual touchpad 80. One method to do so is by having the user tap the back hand, assuming the device 40 includes the sound/finger touch sensor.

Other active methods to determine the touch location may use ultrasound via the wrist carrying the watch and observing the echo signals with an array of sensor. Alternatively, vibrations may be induced at various frequencies in the left hand so that detecting any changes induced by the touch of the finger on the back hand can be used to localize the touch position.

Figure 15:
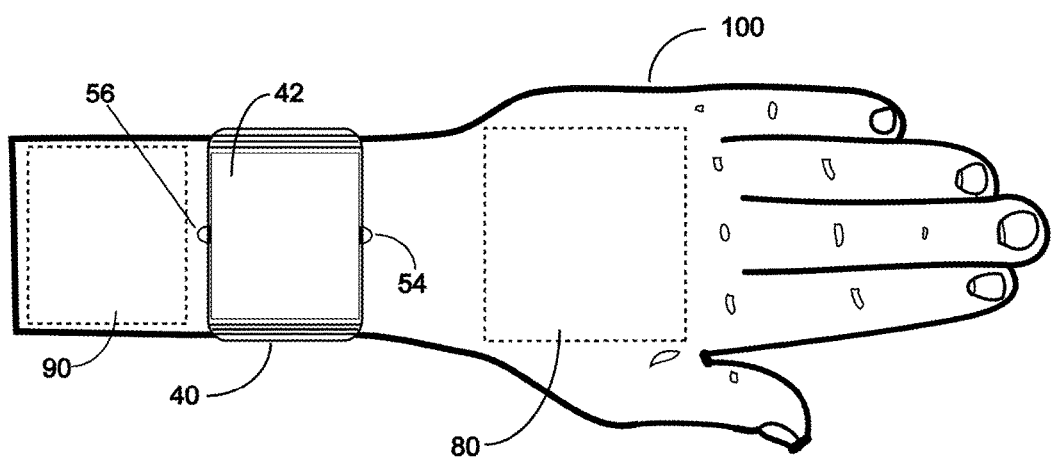
FIG. 15 shows cameras on both sides of the device allowing command entry from both a left virtual touchpad and a right virtual touchpad.

In some embodiments, it is desirable to have cameras on both sides of the smartwatch as shown in FIG. 15, where camera 54 is looking at the right side of the watch (as described in previous embodiments), and 56 is a camera 56 is looking at the left side of the watch. Camera 56 may be kept off unless the user wears the watch on the other hand so that camera 56 faces the virtual back hand touchpad. If the watch design is vertically symmetric, camera 54 would be sufficient when the user uses the other hand as the watch may be rotated to keep camera 54 pointing to the virtual back hand. If the watch design is not vertically symmetric, namely, the watch screen has distinguished top and bottom sides, camera 56 is needed to monitor the virtual back hand touchpad.

In some embodiments, camera 56 is used for a second virtual touchpad 90 placed on the arm side of the watch. When virtual touchpad 90 that is assigned over the arm is exposed, the user may provide command entry from both the left virtual touchpad and the right virtual touchpad. If the arm is covered by a sleeve, the area above the sleeve may be assigned for the second virtual touchpad 90. The movement of the artifacts of texture on the sleeve surface may assist in detecting hovering and touching situation as described in conjunction with FIG. 8. In embodiments, both virtual touchpads may be used interchangeably, so that each virtual touchpad may recognize all the gestures. In other embodiments, a complementary mode may be employed, where each virtual touchpad may recognize only a subset of the gestures. Thus, complex gestures, like the text entry operation of FIG. 3 that includes multiple sub-gestures, may be performed only on the back hand pad 80. Some gestures during complementary mode may need to be entered specifically on the left or the right virtual touchpad at a predefined order. For example, some complementary mode gestures may include left tap and right tap combinations at some preset order. The operation modes when using two or more virtual touchpads are discussed in more detail in the following discussion of FIGS. 16-18.

FIG. 15 shows only a single camera on each side. It should be understood that two cameras (or more) may be placed on each side for stereoscopic distance measurements to the touch locations as explained in FIG. 6.

Figure 16:
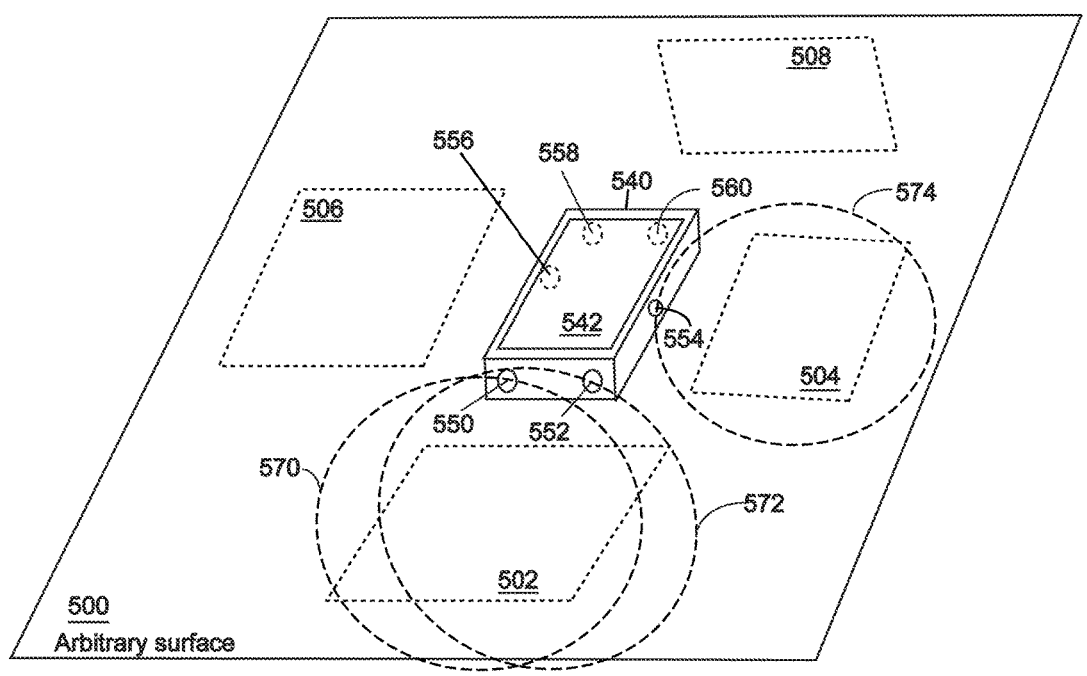
FIG. 16 represents a general case relating to a low-profile device with a display placed on an arbitrary surface where multiple virtual touchpads are defined.

FIG. 16 demonstrates how the teaching of the present invention can be utilized in the case of a general device 540 with a display 542 placed on an arbitrary surface 500, e.g. a low profile device placed on a table surface. The arbitrary surface may be soft or may have texture artifacts that move or change when the user actually touches the surface. The device 540 has multiple cameras placed along one or more sides of the device. FIG. 16 demonstrates a device 540 that uses cameras on all four sides in order to use four virtual touchpads 502, 504, 506 and 508. Two cameras 550 and 552 are placed at the bottom side of the device, and two cameras 558 and 560 are placed at the top side of the device. For illustration purposes, the right and left sides use only one camera each, 554 and 556 respectively. The viewing cones of bottom side cameras 550 and 552 are 570 and 572 respectively, and the viewing cone of the right side camera 554 is 574. For clarity, the viewing cones for the other cameras on the top and left sides are not shown in FIG. 16.

The virtual touchpads are assigned on the arbitrary surface 500 so that they generally correspond to the associated side of the device. However, the size and shape of each virtual touchpad can be different. They can also change dimension dynamically during operation. In FIG. 16, this is demonstrated in having the top virtual touchpad 508 made smaller and placed skewed to the right relative to the top side and at a greater distance from the device compared to the bottom virtual touchpad 502. To further demonstrate the ability to use unequal virtual touchpad assignments, the right virtual touchpad 504 is smaller than the left virtual touchpad 506.

The virtual touchpads may be configured for interchangeable operation mode or for complementary operation mode. In interchangeable operation mode, each virtual touchpad interfaces with the display 542 in a similar fashion to the operation detailed in FIGS. 1-4 above. Thus, the user may tap virtual touchpad 504 to perform some functions, and then perform other functions tapping on virtual touchpad 502 or 506. In complementary operation mode, the virtual touchpads may be configured so that some virtual touchpads perform only tap commands, while other touchpads allow more complex drawing and pinching gestures. Some user interface protocols may include entry on multiple virtual touchpads. Thus, for example, one command can be entered if the user tap once on the left touchpad 506 followed by tapping twice on the right virtual touchpad 504. Another command is simulated when the user taps in opposite order, namely first a tap on virtual touchpad 504 followed by two taps on virtual touchpad 506.

Figure 17:
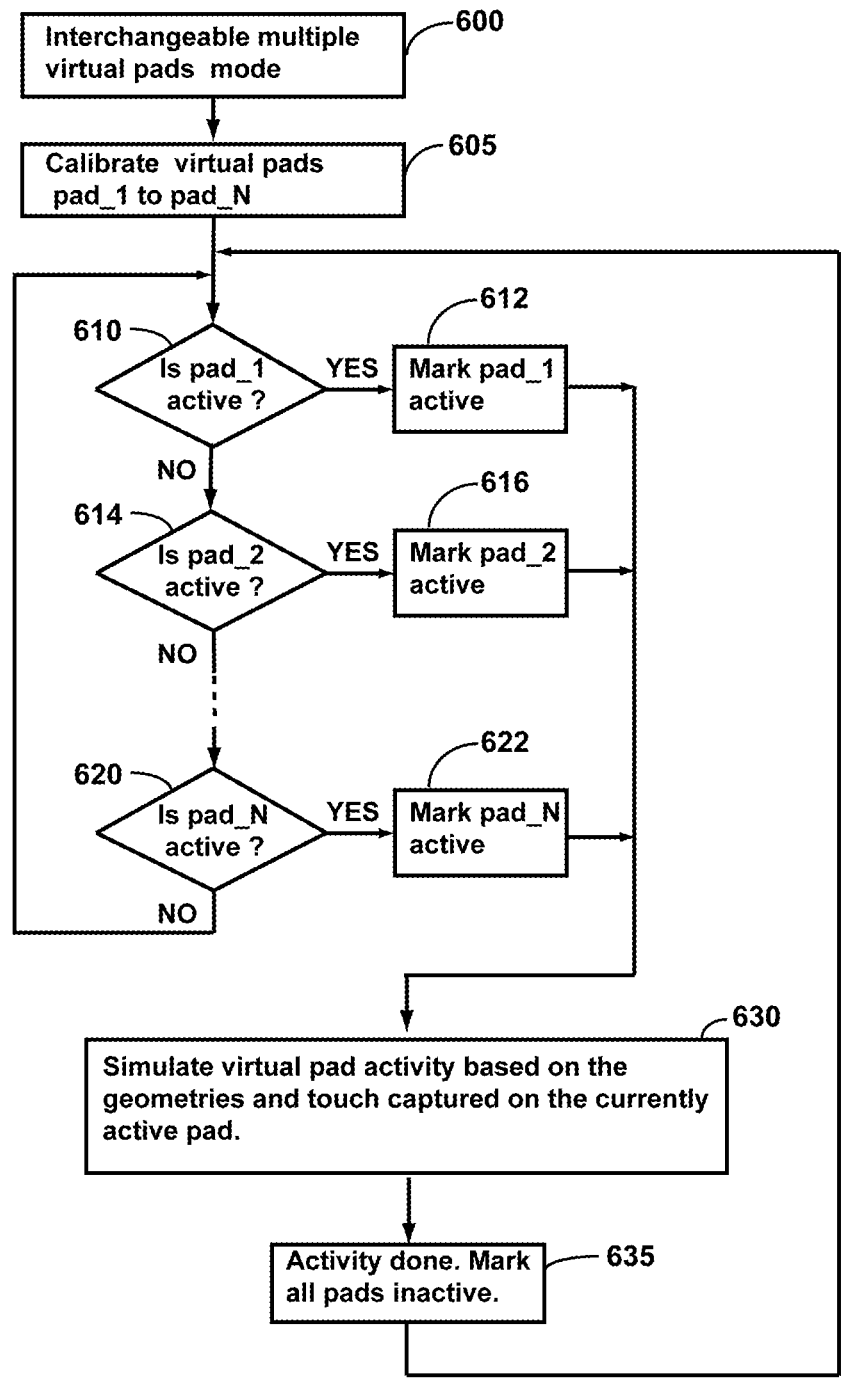
FIG. 17 is a flow diagram of multiple virtual touchpads operating in the interchangeable mode, where the user may perform the same gesture on every virtual touchpad.

FIG. 17 is a flow diagram of N virtual touchpads working in the interchangeable operation mode 600. At step 605, all the N virtual touchpads are assigned their surface areas and are calibrated individually as described in FIG. 11. In Steps 610, 614 and 620, the active touchpad is determined as the virtual touchpad on which the user touches. At that point, the corresponding active touchpad is marked in steps 612, 616 and 622, and step 630 simulates the virtual touchpad activity, based on the geometries of the active touchpad. Step 630 may last a pre-defined period of time or continue to perform while user activity is continuously detected. The activity ends at step 635 when the user function is fully performed or at the end of the pre-defined period of time when no further user activity is detected. Step 635 also marks all touchpads inactive and continues to monitor all the touchpads for new activity.

Figure 18:
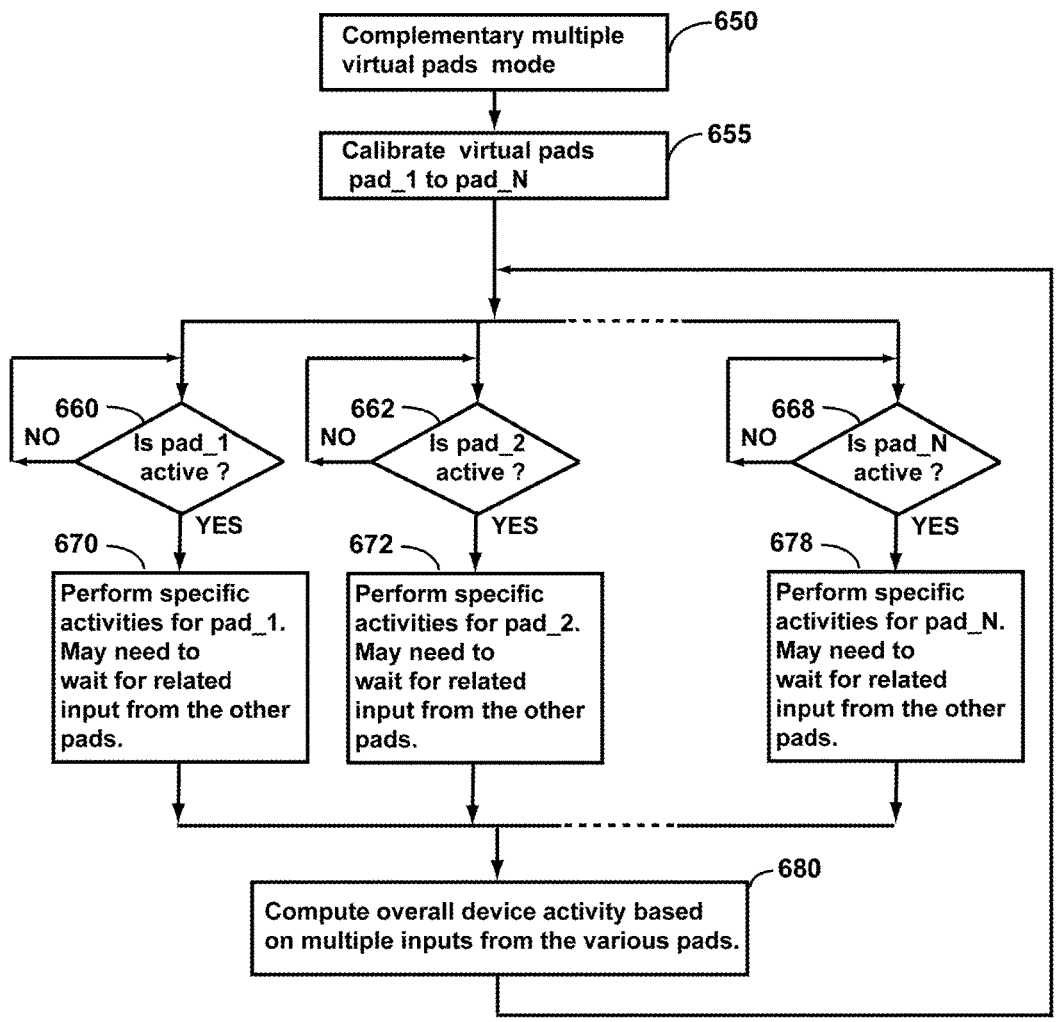
FIG. 18 is a flow diagram of multiple virtual touchpads operating in the complementary mode, where complementary mode gestures require the user to tap on a sequence of different virtual touchpads.

The flow diagram for the complementary operation mode 650 of N virtual touchpads in some embodiments is illustrated in FIG. 18. Again, at step 655, all the N virtual touchpads are assigned their surface areas and are calibrated individually as described in FIG. 11. In this mode all the virtual touchpads may work at any time (that is, their cameras' input is processed at all time), as the user may tap different sequences of touchpads to perform a complex complementary gesture. Therefore, step 660, 662 and 668 monitor the different virtual touchpads for activity. Specific activities relating to the assignment of each virtual touchpad are performed in steps 670, 672, and 678. Each activity may depend on input from a different virtual touchpad when the user creates a complementary mode gesture comprising sequence of taps on different virtual touchpads. At step 680, the overall device activity is performed, based on the multiple inputs from the various touchpads.

Some embodiments of the present invention may include tangible and/or non-transitory computer-readable storage media for storing computer-executable instructions or data structures. Such non-transitory computer-readable storage media can be any available media that can be accessed by a general purpose or special purpose computer, including the processors discussed above. By way of example, and not limitation, such non-transitory computer-readable media can include RAM, ROM, EEPROM, or any other medium which can be used to carry or store desired program code means in the form of computer-executable instructions. Computer-readable medium may be also manifested by information that is being transferred or provided over a network or another communications connection to a processor. All combinations of the above should also be included within the scope of the computer-readable media.

Computer-executable instructions include instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, abstract data types, and the functions inherent in the design of special-purpose processors, etc. that perform particular tasks. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments described above may make reference to specific hardware and software components. It should be appreciated by those skilled in the art that particular operations described as being implemented in hardware might also be implemented in software or vice versa. It should also be understood by those skilled in the art that different combinations of hardware and/or software components may also be implemented within the scope of the present invention.

The description above contains many specifications, and for purpose of illustration, has been described with references to specific embodiments. However, the foregoing embodiments are not intended to be exhaustive or to limit the invention to the precise forms disclosed. Therefore, these illustrative discussions should not be construed as limiting the scope of the invention but as merely providing embodiments that better explain the principle of the invention and its practical applications, so that a person skilled in the art can best utilize the invention with various modifications as required for a particular use. It is therefore intended that the following appended claims be interpreted as including all such modifications, alterations, permutations, and equivalents as fall within the true spirit and scope of the present invention.

I claim:

1. An apparatus optically interfacing with an operator responsive to a predefined set of tactile gestures performed by one or more fingers on one or more virtual touchpads assigned on portions of the surface adjacent to said apparatus, comprising:
   one or more cameras placed along each side of the apparatus facing each one of said virtual touchpads, said cameras configured to obtain sequences of captured images of said virtual touchpads and their surroundings;
   a display; and
   a computer coupled to said cameras and said display, and configured to capture the positions of one or more finger tips and one or more visible surface artifacts that include blemishes, blood vessels, wrinkles, hair, stains, or textures on said virtual touchpads, correlate movements of said surface artifacts with said finger tip positions to distinguish between hovering and touching activities, analyze said hovering and touching activities to detect an operator tactile gesture, and to simulate, based on the detected tactile gesture, a control input to modify said display responsive to said gesture.

2. The apparatus of claim 1, further comprising one or more sound sensors configured to detect and locate tactile gestures on said virtual touchpads, and wherein said detected tactile gestures by said sound sensors are correlated and combined with said tactile gestures detected by said cameras.

3. The apparatus of claim 1, further comprising a motion sensor configured to detect operator tap events on said virtual touchpads adjacent to said apparatus, and wherein said detected tap events by said motion sensor are correlated and combined with said tactile gestures detected by said cameras.

4. The apparatus of claim 1, wherein two or more virtual touchpads are assigned on the surface adjacent to said apparatus, and wherein said virtual touchpads operate in an interchangeable operation mode wherein each virtual touchpad recognizes the entire set of predefined tactile gestures.

5. The apparatus of claim 1, wherein two or more virtual touchpads are assigned on the surface adjacent to said apparatus, and wherein said virtual touchpads operate in a complementary operation mode wherein each virtual pad is responsive only to a pre-assigned subset of said set of predefined tactile gestures.

6. The apparatus of claim 5, wherein one or more complex predefined tactile gestures comprise a combination of sub-gestures, wherein each sub-gesture is assigned to a unique virtual touchpad, and wherein said sub-gestures are performed at a predefined order.

7. The apparatus of claim 1, wherein said apparatus is a smartwatch.

8. The apparatus of claim 7, wherein a first virtual touchpad is assigned on the back hand near the wrist on which said smartwatch is worn and a second virtual touchpad is assigned on the arm adjacent to said smartwatch.

9. A computer-implemented method comprising:
   assigning one or more adjacent portions of the body surface area of a human operator wearing a wearable device as virtual touchpads, said virtual touchpads are placed along one or more sides of said wearable device;
   capturing a sequence of images of said one or more virtual touchpads;
   extracting from said captured images a sequence of positions of one or more finger tips and the adjacent surface artifacts on said virtual touchpads, said surface artifacts include blood vessels, blemishes, wrinkles, hair, stains, or textures;
   correlating movements of said surface artifacts with said finger tip positions to distinguish between hovering and touching activities;
   analyzing said hovering and touching activities to detect a predefined gesture from a set of predefined gestures;
   simulating a generic tactile touchpad input command that corresponds to said detected gesture; and
   controlling said wearable device in response to said simulated tactile input command.

10. The computer-implemented method of claim 9, further comprising:
    detecting finger tap positions using one or more sound sensors placed within said wearable device; and
    correlating and combining said detected finger tap positions with said sequence of finger tip positions detected by said cameras.

11. The computer-implemented method of claim 9, further comprising:
    detecting finger tap events from vibration data obtain by a motion sensor placed within said wearable device; and
    correlating and combining said detected finger tap events with said sequence of finger tip positions detected by said cameras.

12. A system comprising a portable device placed on a surface, said portable device further comprising:
    one or more processors;
    a display;
    one or more cameras coupled to said one or more processors and configured to detect one or more finger touches on one or more virtual touchpads assigned on portions of said surface, said virtual touchpads are adjacent to said portable device;
    memory; and
    one or more programs, wherein the one or more programs are stored in the memory and configured to be executed by the one or more processors, the one or more programs comprising instructions for:
    capturing from said cameras a sequence of operator touch positions on said virtual touchpads;
    extracting the positions of surface artifacts from images of said virtual touchpads when fingers are detected, said surface artifacts include blood vessels, stains wrinkles, hair, blemishes or textures;
    correlating movements of said surface artifacts with said sequence of operator touch positions to distinguish between hovering and touching activities;
    analyzing said sequence of operator touch positions to detect a predefined tactile gesture from a set of predefined tactile gestures; and
    generating a tactile input command corresponding to said detected gesture to modify said display in response to the detected tactile gesture.

13. The system of claim 12, wherein said one or more cameras are placed on the side of said portable device facing each said virtual touchpad, and wherein each camera further comprising an optical system enhancing side viewing capabilities to enable image capturing of said virtual touchpad and its surrounding.

14. The system of claim 12, wherein said portable device further comprises one or more sound sensors, and wherein said one or more programs further comprising instructions for:
    detecting finger tap positions using said one or more sound sensors; and
    correlating and combining said detected finger tap positions with said sequence of operator touch positions detected by said cameras.

15. The system of claim 12, wherein said portable device further comprises a motion sensor, and wherein said one or more programs further comprising instructions for:
    detecting finger tap events from vibration data obtain by a motion sensor placed within said portable device; and
    correlating and combining said detected finger tap events with said sequence of operator touch positions detected by said cameras.

16. The system of claim 12, wherein two or more virtual touchpads are assigned on a surface adjacent to said portable device, and wherein said virtual touchpads operate in an interchangeable operation mode wherein each virtual touchpad recognizes the entire said set of predefined tactile gestures.

17. The system of claim 12, wherein two or more virtual touchpads are assigned on a surface adjacent to said portable device, and wherein said virtual touchpads operate in a complementary operation mode wherein each virtual touchpad is responsive only to a pre-assigned subset of said set of predefined tactile gestures.

18. The system of claim 12, wherein said one or more programs further comprising instructions for calibrating each assigned virtual touchpad by prompting the operator to tap four corners of the virtual touchpad, wherein a relative transformation is created to map touch positions to screen positions.

19. The system of claim 12, wherein said one or more programs further comprising instructions to recognize and simulate text entry inputs from actual text writing gestures made by a finger of an operator on one of said virtual touchpads.

20. The computer-implemented method of claim 9, wherein assigning two or more virtual touchpads on said body surface area, further comprising operating said virtual touchpads in a complementary operation mode wherein each virtual touchpad is responsive only to a pre-assigned subset of said set of predefined gestures.

21. The computer-implemented method of claim 9, further comprising recognizing and simulating text entry inputs from actual text writing gestures made by a finger of an operator on one of said virtual touchpads.

22. The computer-implemented method of claim 9, wherein assigning two or more virtual touchpads on said body surface area, further comprising operating said virtual touchpads in an interchangeable operation mode wherein each virtual touchpad recognizes the entire set of predefined tactile gestures.

23. The computer-implemented method of claim 9, further comprising calibrating each assigned virtual touchpad by prompting the operator to tap four corners of the virtual touchpad, wherein a relative transformation is created to map touch positions to screen positions.

24. The apparatus of claim 1, wherein said computer is further configured to calibrate each assigned virtual touchpad by prompting the operator to tap four corners of the virtual touchpad, wherein a relative transformation is created to map touch positions to screen positions.

* * * * *